Sept. 27, 1960 L. E. MUTTART 2,953,834
FEEDING METHOD AND APPARATUS FOR THE EXTRUSION
OF SHAPED BODIES OF CEMENTITIOUS MATERIALS
Filed Dec. 11, 1957 2 Sheets-Sheet 2

INVENTOR.
LAWRENCE E. MUTTART
BY W. A. SCHAICH &
LEONARD D. SOUBIER
ATTORNEYS

United States Patent Office 2,953,834
Patented Sept. 27, 1960

2,953,834

FEEDING METHOD AND APPARATUS FOR THE EXTRUSION OF SHAPED BODIES OF CEMENTITIOUS MATERIALS

Lawrence E. Muttart, Toledo, Ohio, assignor, by mesne assignments, to Owens-Corning Fiberglas Corporation, a corporation of Delaware Filed Dec. 11, 1957, Ser. No. 702,061

5 Claims. (Cl. 25—11)

This invention relates in general to an improved method and apparatus suitable for the extrusion and shaping of cementitious materials having a putty-like consistency, and more particularly to an improved method and apparatus for feeding such cementitious materials into the extrusion apparatus.

As is well known in the prior art, high-temperature thermal insulating materials may be prepared from aqueous slurries composed of reactive cementitious materials, such as, for example, finely comminuted reactive alkaline earth metal oxides or hydroxides and silica or the like. According to well-known procedures, the aqueous slurry is then introduced into individual cavity molds having an interior shape conforming to the configuration desired in the resultant cementitious product. The filled molds are then subjected to sufficient heat and/or pressure to react and transform the cementitious contents into shaped indurated bodies possessing a myriad of micro-porous voids distributed homogeneously throughout. After subsequent drying, the resultant indurated material possesses a low thermal conductivity factor, is non-combustible, and exhibits an exceptional structural stability even when exposed to highly elevated temperatures. Thus, such materials are quite suitable for structural insulating purposes and have been utilized quite extensively for such purposes, particularly where thermal transmission must be maintained at a minimum even at extreme elevated temperatures.

It has also been common practice to incorporate a quantity of highly spiculated re-enforcing fibers of amosite, chrysotile, bagasse, or the like into the slurry in order to provide the resultant product with an increased transverse and hinging strength, as well as to improve the suspending properties of the initial slurry.

However, due to the high manufacturing costs involved in producing such insulating materials according to the above individual mold-type of process and the consequent necessity of maintaining a large mold inventory, various attempts and endeavors have been directed toward the development of a process whereby shaped cementitious insulating bodies may be formed in a continuous or semi-continuous manner without utilizing a large complement of molds. One recent development along this line for the production of tubular shapes involves a compaction-type extrusion process which is fully described in the co-pending patent application of William C. Taylor, Serial No. 624,053, filed November 23, 1956, and assigned to the assignee of this application.

According to the last-mentioned development, the cementitious materials are partially reacted into a putty-like mass which is then broken up into gobs or lumps and introduced into a hopper directly overlying the compaction-extrusion apparatus, which briefly comprises an annular extrusion chamber defined by an elongated tubular casing and a coaxial mandrel forming a core within the casing, and a reciprocating piston-like compaction member which travels in the annular space between the core and casing and serves to compact and extrude the material placed within the chamber in the form of a continuous tubular shaped body of material. Operationally, successive charges of the gobs or lumps of material are fed by gravity from the hopper into the annular extrusion chamber through a radial overhead inlet opening formed in the wall of the extrusion chamber. The charges are then successively compacted together within the extrusion chamber by an axially reciprocating compaction member and subsequently extruded as a continuous tubular body of material having sufficient rigidity to maintain its extruded shape under ordinary conditions of careful handling. The extruded body is then cut transversely into individual lengths of desired dimensions and subjected to heat and/or pressure. The heat and/or pressure then substantially completes the reaction between the constituent cementitious materials and transforms the extruded lengths into indurated micro-porous bodies possessing sufficient strength for use as structural insulating members.

Compaction-type extrusion molding of cementitious materials, such as that described in the aforementioned Taylor application, provides an improved method for forming shaped thermal insulating bodies in a manner which is substantially more economical and expeditious than previous methods. However, it is important to note that such apparatus embodies the concept of gravitationally feeding gobs or lumps of putty-like cementitious materials through an opening leading radially into the extrusion chamber. Experience has indicated that gravity-type radial feeding frequently causes the gobs or lumps of the putty-like cementitious materials to accumulate in localized regions of the extrusion chamber and as a result the extruded body is frequently misshapen and does not conform to the cross-sectional interior configuration of the extrusion chamber. For example, as a charge of the partially reacted cementitious materials is gravitationally fed through a radial opening extending through the top surface of the extrusion chamber, the gobs or lumps of material comprising the charge precipitate downward and impinge against the core of the annular chamber and become entrapped inbetween the chamber wall and the core. Consequently, the gobs or lumps of material tend to bind or wedge together in the upper regions of the extrusion chamber and preclude sufficient receipt of material in the lower regions of the chamber. As a result, the extruded material does not conform to the desired configuration of the extrusion chamber, or exhibits localized transverse weakness due to non-uniform compaction, or both.

As contrasted with the gravity-type radial feeding discussed above, the present invention embodies the novel concept of positively advancing the cementitious materials tangentially into the extrusion apparatus for the purposes, among others, of producing a shaped extruded body of cementitious material having improved physical characteristics, and of obviating the objectionable features accompanying gravity-type radial feeding techniques discussed above.

Accordingly, a principal object of the present invention is to provide an improved method and apparatus for forming shaped bodies of cementitious materials.

Another object of the present invention is to provide an improved method and apparatus for feeding successive charges of putty-like cementitious, insulating materials into a compaction-type extrusion apparatus.

A further object of the present invention is to provide an improved method and apparatus for obviating the objectionable features of compaction-type extrusion apparatus employing radial feeding techniques.

A still further object of the present invention is the provision of a method and apparatus for feeding cementitious materials into an elongated tubular extrusion chamber characterized by injecting said materials into said chamber through a plurality of ports tangentially communicating with oppositely situated regions of said chamber.

The specific nature of this invention, as well as other objects and advantages thereof, will become apparent to those skilled in the art from the following detailed description taken in conjunction with the two annexed sheets of drawings on which, by way of example only, one preferred embodiment of this invention is illustrated.

Referring to the drawings:

Figs. 4 and 5 are sectional views taken along the line 4—4 in Fig. 2, respectively illustrating the apparatus during different intervals of the feeding steps.

Figure 1:
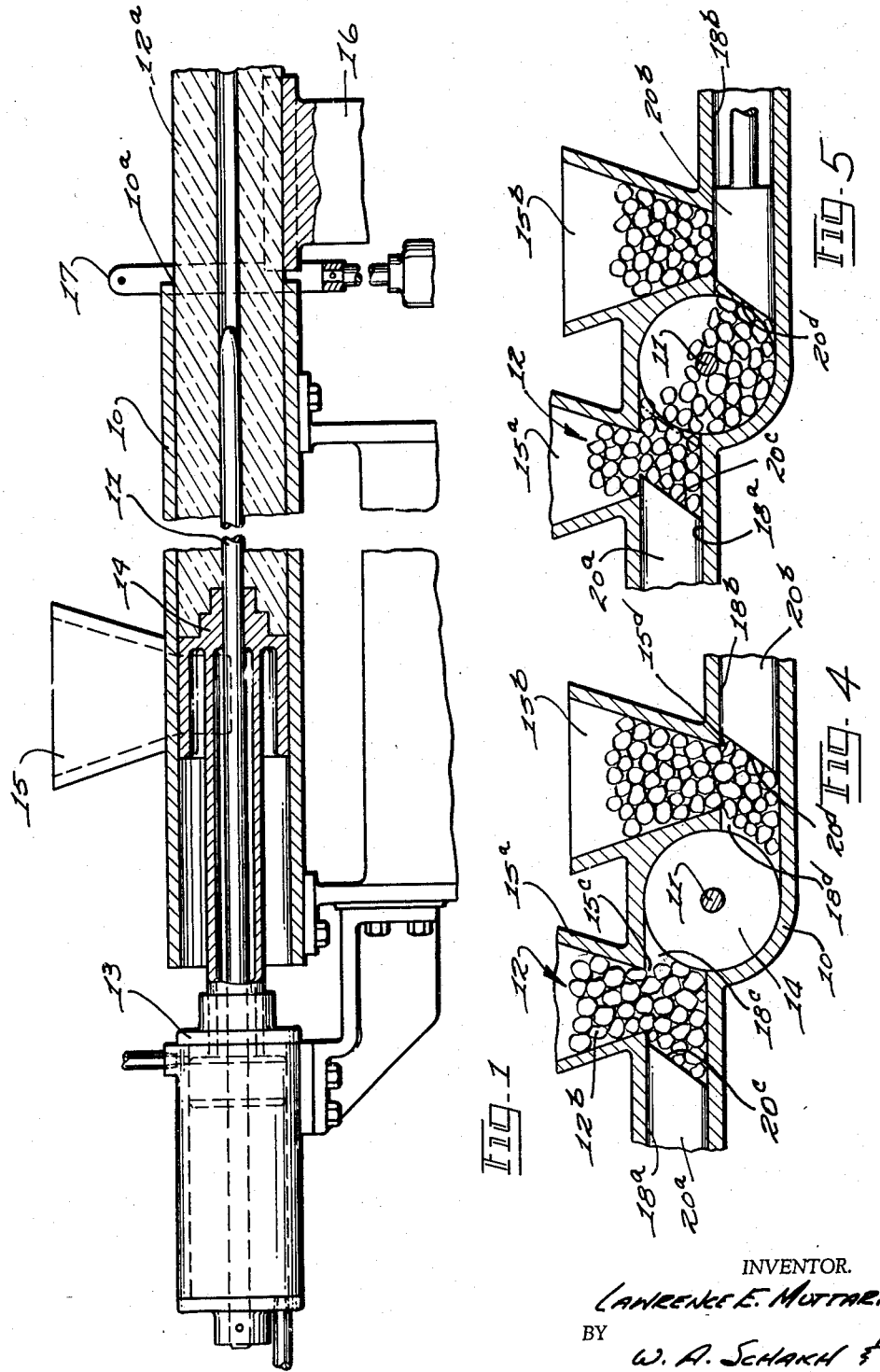
Fig. 1 is a side elevational view, partly in section, of a compaction-type extrusion apparatus embodying the present invention.

Generally, the present invention involves an improved method and apparatus for feeding cementitious materials into a compaction-type extrusion apparatus of the general type shown in Fig. 1 and more fully described in the co-pending patent application of W. C. Taylor, mentioned previously. Briefly, the compaction-type extrusion apparatus, in which the present invention is embodied, comprises an elongated tubular casing 10 in which there is positioned a stationary, co-axial mandrel 11 which forms the core of the extrusion chamber and cooperates with the casing 10 to define an annular molding space in which to compact and extrude successive charges 12 (Fig. 2) of cementitious material in the form of a continuous tubular shaped body of material 12a. Slidably journalled on the mandrel 11 there is an annular compaction member 14 having a close fitting slidable relationship with the interior surface of casing 10. Operatively connected to the compaction member 14 there is a hydraulic cylinder 13, which reciprocates the compaction member 14 axially within the annular molding space between the casing 10 and the mandrel 11.

The charges 12 of cementitious material are fed successively into the extrusion chamber from a stationary hopper 15 positioned above the casing 10. Each of the charges 12 includes a quantity of putty-like gobs or lumps 12b of a partially reacted cementitious slurry, preferably comprised of an alkaline earth metal oxide or hydroxide, silica and re-enforcing fibers. The charges 12 are deposited within the extrusion chamber between each successive forward stroke of the reciprocating compaction member 14. Each successive charge 12 of the cementitious material is then compacted by the compaction member 14 and is concurrently moved forward thereby and extruded from the discharge end 10a of the casing 10 in the form of a continuous shaped body 12a.

A movable supporting stand 16, spaced a short distance outwardly from the discharge end 10a of the casing 10, supports the compacted material 12a as it emerges from the discharge end 10a of the casing 10. After a desired length of the compacted material 12a has been extruded, it is then transversely severed by a conventional cutting mechanism, such as a wire cutter 17. The cutting movement of the wire cutter 17 is synchronized with the reciprocating compaction member 14 in such a manner that the wire cutter 17 severs the material between intermittent extruding movements thereof. After a desired length has been so severed, the severed lengths of shaped cementitious materials may, by exposing same to heat and/or pressure, be further reacted and thereby hardened or indurated to form a rigid self-supporting body of integrated micro-porous structure suitable for thermal insulating purposes.

Figure 2:
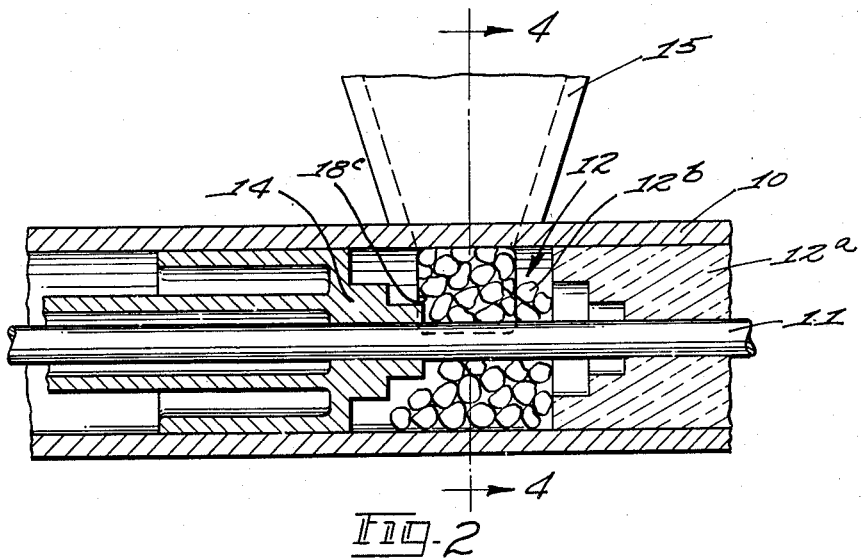
Fig. 2 is an enlarged fragmentary sectional view of the apparatus, as shown in Fig. 1, illustrating the position of the compaction member when a charge of cementitious material is being fed into the extrusion chamber.
Figure 3:
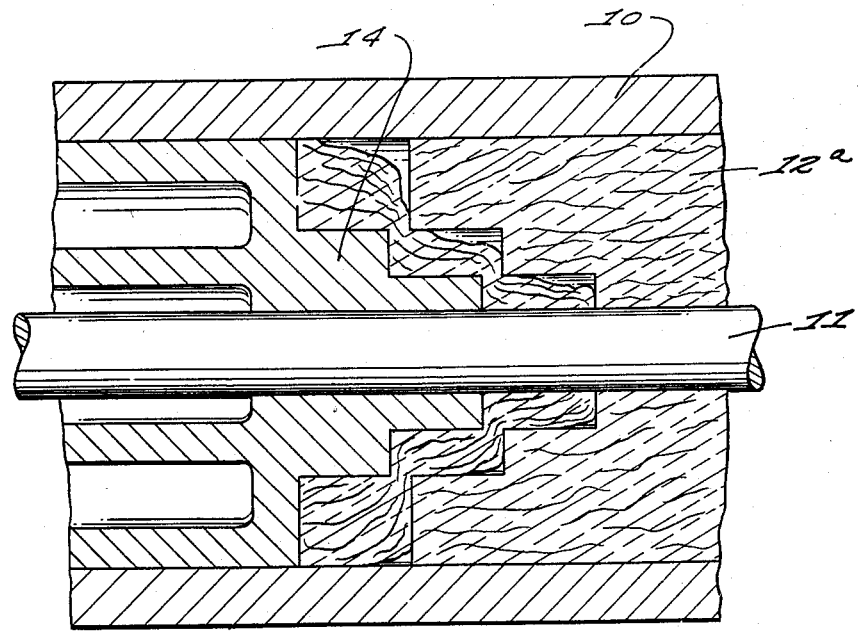
Fig. 3 is an enlarged fragmentary sectional view similar to Fig. 2, but illustrating the compaction member in an extended position compacting the cementitious material.

The means for successively charging the gobs or lumps 12b of the cementitious material into the extrusion chamber is best illustrated by Figs. 1 and 2. As illustrated, it will be observed that the reciprocating movement of the compaction member 14 serves to open and close the hopper 15 relative to the extrusion chamber, i.e., as the compaction member 14 is extended it closes the hopper relative to the extrusion chamber (Fig. 1), and, conversely, as the compaction member is retracted (Fig. 2) it opens the hopper. Thus the reciprocating compaction member 14 successively opens and closes the hopper 15 in timed relation with the compaction and extrusion of the material.

According to the present invention, the gobs or lumps 12b of the putty-like partially reacted cementitious materials are fed tangentially into vertically opposite sides of the extrusion chamber. This tangential feeding is effected by passing the gobs or lumps 12b of cementitious material from the hopper 15 through a pair of chutes 15a and 15b extending downwardly from the open bottom of the hopper and digressing to opposite sides of the extrusion chamber, as illustrated in Fig. 4. The chutes 15a and 15b empty through inlet openings 15c and 15d respectively into conduits 18a and 18b, which in turn respectively have ports 18c and 18d tangentially communicating with vertically opposite sides of the extrusion chamber. It is significant to note that the ports 18c and 18d are respectively positioned vertically above and below the mandrel 11 so that port 18c communicates with the upper portion of the extrusion chamber and port 18d communicates with the lower portion thereof. Naturally, the size of the ports 18c and 18d, as well as the size of the openings 15c and 15d, is dependent upon the size of the extrusion chamber, the quantity and character of the material constituting each charge and the amount of compacting force developed by the compaction member 14. The feeding apparatus further includes reciprocating pistons, or rams, 20a and 20b which individually reciprocate axially within the respective conduits 18a and 18b. The rams 20a and 20b are suitably connected at their respective outer ends to a conventional reciprocating mechanism, not illustrated, for imparting reciprocating movement thereto. As a result, the rams 20a and 20b reciprocate between alternative axially extended and retracted positions, as comparatively shown by the alternative positions occupied by the ram 20b in Figs. 4 and 5. Additionally, the reciprocation of the rams 20a and 20b is effected in timed relation with the movement of the compaction member 14 and in such manner that the rams will be in a retracted position when the compaction member is in an extended compacting position, such as is illustrated in Fig. 1, and vice versa. Additionally, the reciprocation of the rams 20a and 20b may be effected in such manner that the rams move in unison, or, as illustrated in Fig. 5, in sequence, as will subsequently be described. In either event, however, as the rams 20a and 20b are extended they close the inlet openings 15c and 15d positioned along the path of travel of the rams, and advance a two-part charge 12 of the cementitious material through the conduits 18a and 18b respectively into the upper and lower portions of the extrusion chamber. Conversely, as the rams 20a and 20b are retracted the inlet openings 15c and 15d are opened and a new two-part charge 12 is deposited respectively in the conduits 18a and 18b preparatory to the next succeeding advancement of the rams 20a and 20b.

The rams 20a and 20b are preferably formed with tapered faces 20c and 20d on their respective material engaging ends which, when the rams are in an extended position, coincide tangentially with the interior surface of the casing 10 and permit a maximum amount of the cementitious material to be ejected from the conduits 18a and 18b without having the material engaging ends of the rams projecting into the extrusion chamber and interfering with the movement of the compaction member 14 or transversely compacting the cementitious material as it is fed into the extrusion chamber.

Although the above construction has been found to function exceptionally well when the rams 20a and 20b are extended and retracted in unison, it is readily recognized that in certain instances it may be preferable to reciprocate the rams in relative sequential movement. As shown in Fig. 5, the relative sequential movement between the rams 20b, which feeds part of the charge 12 into the lower portion of the extrusion chamber and that of the ram 20a, which feeds the other part of the charge 12 into the upper portion of the extrusion chamber, is such that the portion of the charge 12 advanced by ram 20b will be deposited in the extrusion chamber before that portion of the charge 12, advanced by ram 20a, is similarly deposited. In other words, the ram 20b deposits the cementitious material within the extrusion chamber in advance of the ram 20a. Thus, the possibility of the cementitious material deposited in the chamber by ram 20a precipitating downward into the lower portion of the extrusion chamber and interfering with the feeding of cementitious material deposited by the ram 20b is obviated.

Many advantages reside in the foregoing method and apparatus one of which is the formation of a compacted and extruded homogeneous body of cementitious material having a cross sectional configuration conforming very closely to the interior cross sectional configuration of the extrusion chamber. It is also significant that the compacted and extruded material will possess a high degree of homogeneity throughout, including a uniform degree of compaction which enhances the overall strength of the material. Additionally, the maintenance and operating costs involved in producing such extruded shapes are substantially reduced as a result of the elimination of congestion of the cementitious material in localized regions of the compaction zone of the extrusion chamber.

It will, of course, be understood that various details of construction may be modified throughout a wide range without departing from the principles of this invention, and it is not, therefore, the purpose to limit the patent granted hereon otherwise than as necessitated by the scope of the appended claims.

I claim:

1. In an apparatus for compaction-type extrusion of shaped cementitious materials, the combination with a compaction member and a compaction-type extrusion chamber housing said compaction member, of a feed apparatus for feeding cementitious materials into said extrusion chamber, said feed apparatus having at least two conduits respectively communicating with opposite sides of said extrusion chamber and having vertically spaced axes oriented on opposite sides of the axis of extrusion, each of said conduits defining an opening therein through which to receive said cementitious materials, and rams mounted for axial reciprocation within said conduits for advancing said cementitious materials through each of said conduits into said extrusion chamber.

2. In an apparatus for compaction-type extrusion of shaped cementitious materials, the combination with a compaction member and a compaction-type extrusion chamber housing said compaction member, of a feed apparatus for feeding cementitious materials into said extrusion chamber, said feed apparatus having at least two conduits respectively communicating with opposite sides of said extrusion chamber and having vertically spaced axes oriented on opposite sides of the axis of extrusion, each of said conduits defining an opening therein through which to receive said cementitious materials, and rams mounted respectively within said conduits for sequentially related axial reciprocation for advancing said cementitious materials through each of said conduits into said extrusion chamber.

3. The combination defined in claim 2, wherein said rams have material engaging ends respectively shaped to concide tangentially with the wall surface of said extrusion chamber.

4. A method of shaping and extruding elongated annular formations of cementitious materials, comprising the steps of sequentially depositing successive charges of cementitious materials into an axially elongated annular extrusion chamber, compacting each deposited charge against a preceding similarly compacted charge concurrently to shape and extrude same in the form of a continuous annular formation, said compacting step being carried out in timed alternating sequence with and during the time interval between the depositing of each successive charge, said depositing step including the further steps of depositing a first portion of each successive charge into the lower portion of said chamber at a location beneath the axis of extrusion and subsequently depositing the remaining portion of each successive charge in the upper portion of said chamber above said first portion.

5. A method of shaping and extending elongated annular formations of cementitious materials, comprising the steps of filling an axially elongated annular extrusion chamber with successive charges of cementitious materials, compacting each successive charge against a preceding similarly compacted charge concurrently to shape and extrude same in the form of a continuous annular formation, said compacting step being carried out in timed alternating sequence with and during the time interval between the filling of each successive charge, said filling step including the further steps of filling the lower portion of said chamber at a location beneath the axis of extrusion with a first portion of each successive charge and thereafter filling the upper portion of said chamber with the remaining portion of each successive charge.

References Cited in the file of this patent

UNITED STATES PATENTS

| | | |
|---|---|---|
| 1,863,507 | Southgate | June 14, 1932 |
| 2,005,886 | Brown | June 25, 1935 |
| 2,359,840 | Goessling | Oct. 10, 1944 |
| 2,501,595 | Bohannon | Mar. 21, 1950 |
| 2,792,594 | Keaton et al. | May 21, 1957 |